(12) United States Patent
Meador et al.

(10) Patent No.: US 6,246,213 B1
(45) Date of Patent: Jun. 12, 2001

(54) DEVICE HAVING BATTERY-SAVE CIRCUITRY AND METHOD OF OPERATION

(75) Inventors: Richard B. Meador, Gilbert, AZ (US); Wayne W. Ballantyne, Plantation; Ronald H. Deck, Cooper City, both of FL (US); Habib Kilicaslan, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/515,247

(22) Filed: Feb. 29, 2000

(51) Int. Cl.[7] .................................................. H01M 10/44
(52) U.S. Cl. ........................................... 320/135; 320/133
(58) Field of Search ..................................... 320/127, 128, 320/133, 135, 155, 157, 160, 163

(56) References Cited

U.S. PATENT DOCUMENTS 5,589,756 * 12/1996 Wilson et al. .

5,614,806 * 3/1997 Wilson et al. .

* cited by examiner

Primary Examiner—Edward H. Tso
(74) Attorney, Agent, or Firm—Frank M. Scutch, III

(57) ABSTRACT

A device having battery-save circuitry includes a power-on reset circuit (603), an OR-gate (604) coupled to the power-on reset circuit (603), a current-boost timer circuit (602) coupled to the OR-gate (604), a reference oscillator (403) with a start-up current mode enabled by the current-boost timer circuit (602), and a low current secondary reference oscillator (613). A method of operating the device includes operating the device in a battery-save mode and an active mode. A first clock signal is used as a microprocessor clock signal while operating the device in the battery-save mode, and a second or third clock signal is used as the microprocessor clock signal while operating the device in the active mode.

31 Claims, 2 Drawing Sheets

DEVICE HAVING BATTERY-SAVE CIRCUITRY AND METHOD OF OPERATION

FIELD OF THE INVENTION

This invention relates to electronics, in general, and to devices having battery-save circuitry and methods of operation, in particular.

BACKGROUND OF THE INVENTION

Batteries power cellular telephones and other portable or mobile electronic devices, and these batteries need to be recharged frequently. To reduce the need for recharging the batteries in the mobile electronic devices, the devices may be turned-off, or the devices may remain on while operating in a battery-save mode. However, the battery-save mode of many cellular telephones still has a current drain as high as two to three milliAmperes (mA) because all of the clock generation circuits in the devices continue to operate during the battery-save mode. Thus, the battery-save mode of these cellular telephones still shortens the lifetime of the batteries by a significant amount.

To increase the lifetime of the batteries, other cellular telephones remove the primary supply voltage from a majority of the circuits inside the cellular telephones during the battery-save mode. However, these cellular telephones cannot receive incoming telephone calls when operating in the battery-save mode. Therefore, to avoid missing incoming calls, these cellular telephones must periodically cycle out of the battery-save mode and into an active mode to re-apply the primary supply voltage to the circuits inside the cellular telephone. This cycle may be repeated several times per second. The high rate of on and off switching of the primary power supply requires low-value by-pass capacitors to be connected to the power supply lines of the primary power supply. However, the low-value by-pass capacitors provide very limited protection from power supply transients and require specialized charging and discharging circuits to quickly remove and re-apply the primary power supply voltages. Another disadvantage to switching off the primary supply voltage during the battery save mode is the loss of programmed control data that must be reprogrammed when the primary supply voltage is re-applied in the active mode.

Accordingly, a need exists for a device having battery-save circuitry and a method of operation that extends battery life without turning off the primary power supply so that specialized charging and discharging circuits are not required, programmed data can be retained, and high value by-pass capacitors can be used in the device.

BRIEF DESCRIPTION OF THE DRAWINGS

The invention will be better understood from a reading of the following detailed description, taken in conjunction with the accompanying drawing figures in which.

Figure 1:
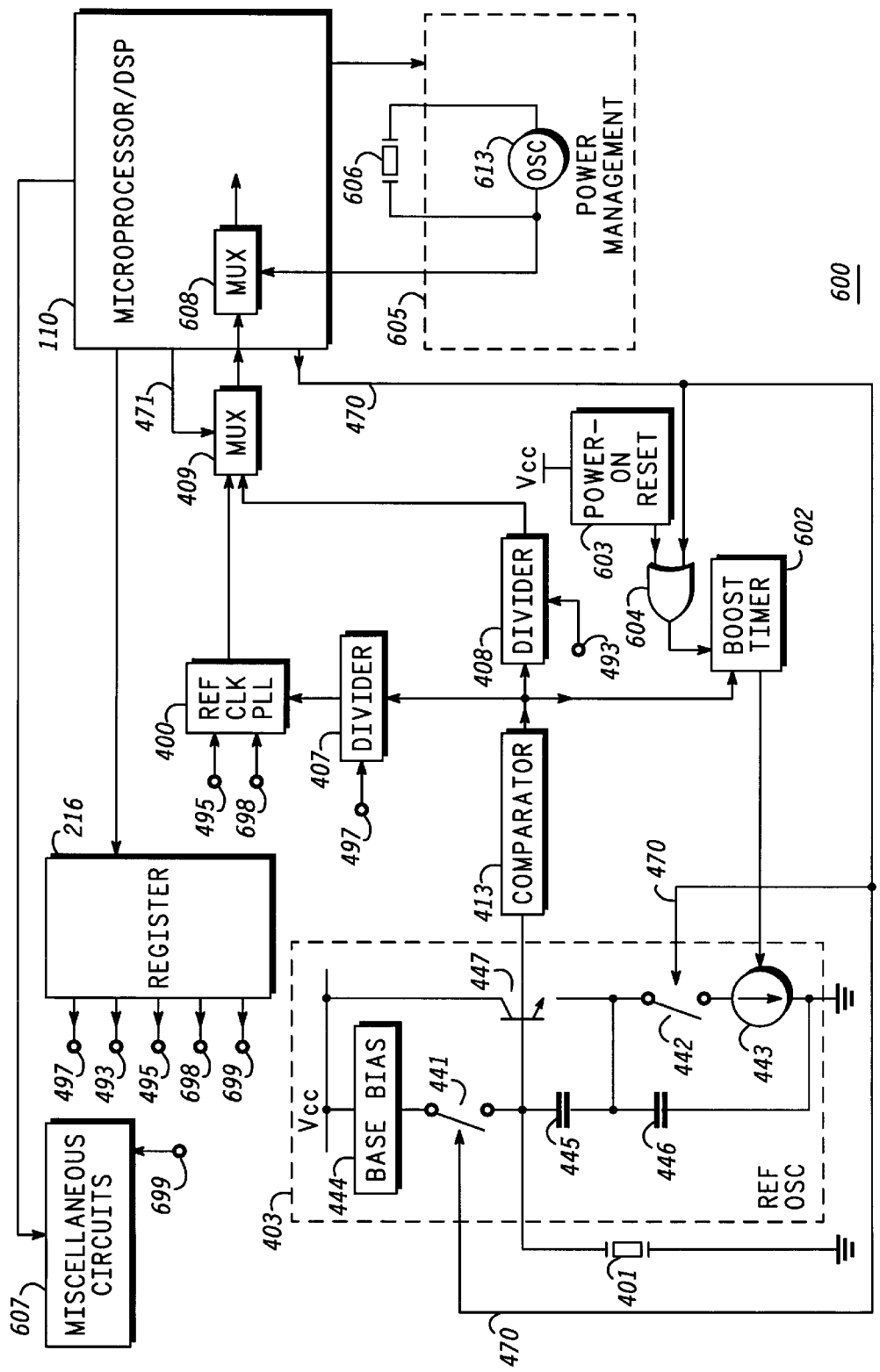
FIG. 1 illustrates a block diagram of a device having battery-save circuitry in accordance with an embodiment of the invention.

For simplicity and clarity of illustration, the drawing figures illustrate the general manner of construction, and descriptions and details of well-known features and techniques are omitted to avoid unnecessarily obscuring the invention.

DETAILED DESCRIPTION OF THE DRAWINGS

FIG. 1 illustrates a block diagram of a device 600 having battery-save circuitry. Device 600 comprises a microprocessor 110 that can include a digital signal processor (DSP). Alternatively, microprocessor 110 can be a microcontroller that includes a microprocessor and a DSP. Device 600 also comprises a serial control register 216 coupled to microprocessor 110. Device 600 further comprises a plurality of miscellaneous circuits 607 coupled to microprocessor 110. As an example, circuits 607 can include radio frequency (RF) transmission and reception circuitry.

Device 600 additionally comprises a primary crystal reference oscillator 403 coupled to microprocessor 110, a comparator 413 coupled to reference oscillator 403, and a crystal element 401 coupled to reference oscillator 403. As an example, reference oscillator 403 can comprise a base bias portion 444, a switch 441 coupled to base bias portion 444, a capacitor 445 coupled to switch 441, and a capacitor 446 coupled to capacitor 445. Reference oscillator 403 can also comprise an NPN bipolar transistor 447 having a collector coupled to base bias portion 444 via a primary power supply and also having a base coupled to switch 441 and to capacitor 445. Reference oscillator 403 can further comprise a switch 442 coupled to capacitors 445 and 446 and to an emitter of transistor 447 and can additionally comprise a current source 443 coupled to switch 442 and to capacitor 446 via ground. Switches 441 and 442 are controlled via a control line 470 coupled to microprocessor 110. Furthermore, the base of transistor 447 is coupled to comparator 413. One skilled in the art will understand that reference oscillator 403 can comprise other components known in the art.

Device 600 also comprises a programmable reference divider 407 coupled to reference oscillator 403 via comparator 413, a reference clock phase lock loop (PLL) 400 coupled to divider 407, and a multiplexor (mux) 409 coupled to PLL 400. Device 600 additionally comprises a programmable reference clock divider 408 coupled to mux 409 and to reference oscillator 403 via comparator 413.

Reference oscillator 403 may be coupled to mux 409 through two selectable paths. In a first path, reference oscillator 403 is coupled to mux 409 via comparator 413 and divider 408, and in a second path, reference oscillator 403 is coupled to mux 409 via comparator 413, divider 407, and reference clock PLL 400. In this second path, the reference oscillator 403 provides an input reference clock signal for reference clock PLL 400, and the output signal of reference clock PLL 400 is coupled to mux 409. Each of the two paths provides a different clock signal to mux 409, and mux 409 determines which of the clock signals is used as a microprocessor clock signal for microprocessor 110. Mux 409 is preferably a deglitch, synchronous clock switching mux that uses clock pulse stretching to avoid transmitting a clock pulse with an extremely short duration that adversely affects microprocessor 110. Accordingly, the deglitch circuitry in mux 409 prevents corruption of the clock signal to microprocessor 110 when the source of the clock signal is switched from the first path to the second path or from the second path to the first path.

The frequency of the clock signal from reference clock PLL 400 is programmable and may be calibrated or automatically frequency corrected (AFC) with greater accuracy compared to the frequency of the clock signal from reference oscillator 403. However, reference clock PLL 400 drains current when enabled, and this current drain substantially reduces the lifetime of the battery or primary power supply of device 600. Microprocessor 110 can use the clock signal from reference clock PLL 400 when device 600 operates in the active mode depending on the particular frequency and accuracy requirements of the microprocessor clock signal in the active mode. Microprocessor 110 can also use the clock signal from reference oscillator 403 when device 600 operates in either the active mode or the battery-save mode. However, both reference clock PLL 400 and reference oscillator 403 are preferably turned off in the battery-save mode. Therefore, microprocessor 110 preferably uses the clock signal from reference oscillator 403 only during the active mode.

During operation of device 600, reference oscillator 403 operates at a particular frequency such as, for example, a frequency of approximately twenty-six megahertz (MHz). Reference oscillator 403 oscillates at the assigned frequency of crystal element 401 and transmits an analog clock signal to comparator 413. Comparator 413 converts the analog clock signal into a digital clock signal and transmits the digital clock signal to dividers 407 and 408. Then, microprocessor 110 sends signals to register 216. In response to the signals from microprocessor 110, register 216 can send a control signal to divider 408 via a node 493 to divide the frequency of the digital clock signal received from comparator 413 by a first divider ratio number, or register 216 can send a control signal to divider 407 via a node 497 to divide the frequency of the digital clock signal received from comparator 413 by a second divider ratio number. If register 216 sends a control signal to divider 407, then register 216 also sends another control signal to reference clock PLL 400 via a node 495 to program a divider ratio in PLL 400. Microprocessor 110 also sends a control signal to mux 409 via a control line 471 to determine whether to transmit the more precise microprocessor clock signal from reference clock PLL 400 to microprocessor 110 or to transmit the less precise microprocessor clock signal from reference oscillator 403 to microprocessor 110.

As illustrated in FIG. 1, device 600 also includes battery-save circuitry comprising a crystal element 606 and a low current secondary crystal reference oscillator 613 in a power management circuit 605 and coupled to crystal element 606 and to microprocessor 110. Power management circuit 605 can include other components such as, for example, circuitry for a keyboard interface, circuitry for a video display interface, circuitry for an audio speaker, and a voltage regulator. Crystal element 606 preferably operates at a much lower frequency than crystal element 401. As an example, crystal element 606 can operate at a frequency of approximately thirty-two kilohertz (KHz). Crystal element 606 and reference oscillator 613 of power management circuit 605 transmit a microprocessor clock signal to microprocessor 110. The technique of using a much lower oscillator frequency for supplying this microprocessor clock signal consumes less power and has a much lower current drain than the techniques for supplying either of the previous two microprocessor clock signals. Accordingly, microprocessor 110 uses this much lower frequency microprocessor clock signal when device 600 operates in the battery-save mode.

Power management circuit 605 transmits the microprocessor clock signal to a mux 608 within microprocessor 110. Mux 608 also receives a microprocessor clock signal from mux 409. Similar to mux 409, mux 608 is preferably a deglitch, synchronous clock switching mux. In the preferred embodiment, microprocessor 110 uses the microprocessor clock signal generated from crystal element 606 and oscillator 613 when device 600 operates in the battery-save mode or when device 600 shuts off and is not in service. Microprocessor 110 preferably uses the microprocessor clock signal generated from crystal element 401 and reference clock PLL 400 when device 600 operates in the active mode. The operation of these components of the battery-save circuitry in conjunction with the other components of device 600 is described in more detail in FIG. 2.

As illustrated in FIG. 1, device 600 further includes additional battery-save circuitry comprising a power-on reset circuit 603, a two-input OR-gate 604 coupled to power-on reset circuit 603 and to microprocessor 110 via control line 470, and a current-boost timer circuit 602 coupled to OR-gate 604, to current source 443 of reference oscillator 403, and to comparator 413. Current-boost timer circuit 602 sends a control signal to current source 443 to program current source 443 to operate either in a high current mode during a start-up of reference oscillator 403 or in a normal current mode after the start-up of reference oscillator 403. These additional components of the battery-save circuitry reduce an amount of time required to generate the active mode microprocessor clock signal when device 600 is initially turned on or when device 600 transitions from the battery-save mode to the active mode. The operation of these additional components of the battery-save circuitry in conjunction with the other components of device 600 is described in more detail in FIG. 2.

In the preferred embodiment, register 216, reference oscillator 403, comparator 413, dividers 407 and 408, reference clock PLL 400, mux 409, power-on reset circuit 603, OR-gate 604, boost timer circuit 602, and at least a portion of miscellaneous circuits 607 are located in a single device or chip. For example, the device can be a bipolar complementary metal oxide semiconductor (BiCMOS) integrated circuit (IC) that is packaged in a ball grid array (BGA) surface mount package.

Figure 2:
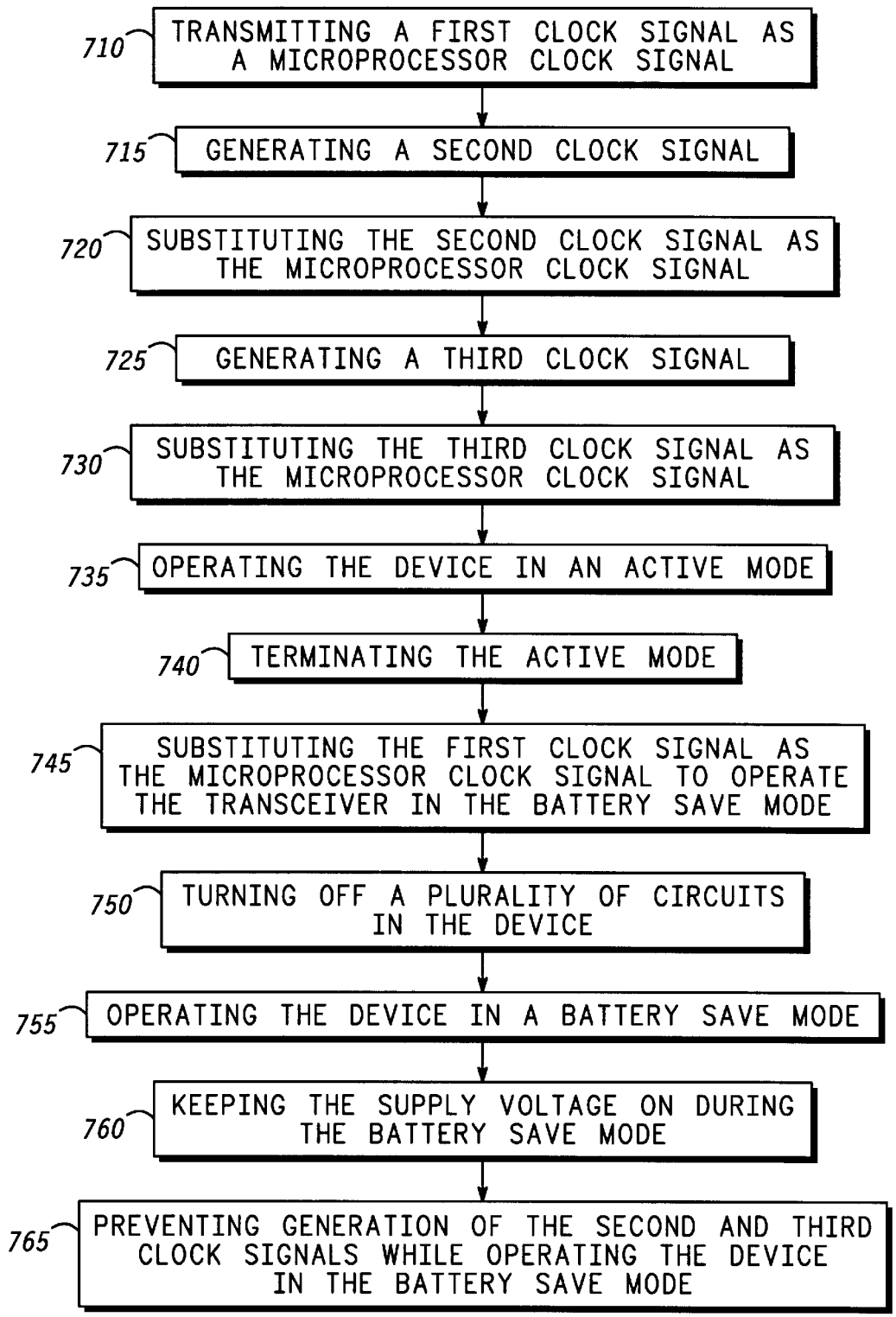
FIG. 2 illustrates a flow chart for a method of operating the device of FIG. 1 in accordance with an embodiment of the invention.

FIG. 2 illustrates a flow chart for a method 700 of operating device 600 of FIG. 1. At a step 710 of method 700, a first clock signal is transmitted as a microprocessor clock signal to a microprocessor, such as microprocessor 110 in FIG. 1. As an example, crystal element 606 (FIG. 1) and oscillator 613 (FIG. 1) in power management circuit 605 (FIG. 1) can generate the first clock signal and can transmit the first clock signal to microprocessor 110 (FIG. 1) while device 600 (FIG. 1) operates in a battery-save mode or while device 600 is turned off and is not in service.

At a step 715 of method 700, a second clock signal is generated. The second clock signal is different from the first clock signal, and the circuitry used to generate the second clock signal has higher current drain than the circuitry used to generate the first clock signal. As an example, crystal element 401 (FIG. 1), reference oscillator 403, and other components, as described earlier with reference to FIG. 1, can generate the second clock signal. Crystal element 606 and power management circuit 605 continue to transmit the first clock signal to microprocessor 110 during step 715.

If device 600 (FIG. 1) performs step 715 when device 600 is initially turned on, then step 715 can be comprised of the following steps described in reference to FIG. 1. Microprocessor 110 transmits a low signal to OR-gate 604 and to reference oscillator 403 via a control line 470 to close switches 441 and 442 in reference oscillator 403. The closing of switches 441 and 442 couples base bias portion 444 and current source 443 to the other components of reference oscillator 403. Power-on reset circuit 603 transmits a high pulse through OR-gate 604 that arms, resets, or activates boost timer circuit 602. After transmitting the high pulse, power-on reset circuit 603 transmits a low signal to OR-gate 604. In response to the high pulse from power-on reset circuit 603, boost timer circuit 602 resets a timer or a counter, and circuit 602 sends a control signal to current source 443 in reference oscillator 403 to operate current source 443 in the higher current start-up mode. In this higher current start-up mode, current source 443 generates a current having at least twice its normal magnitude. The high bias current supplied by current source 443 to the other components of reference oscillator 403 increases the negative resistance of reference oscillator 403 to reduce the start-up time for powering-on reference oscillator 403. Accordingly, the start-up time for reference oscillator 403 can be as short as five milliseconds (ms).

Reference oscillator 403 transmits its clock signal through comparator 413 to the timer in boost timer circuit 602. After counting a predetermined number of clock cycles of the clock signal received from reference oscillator 403, boost timer circuit 602 times out and sends a control signal to current source 443 to operate current source 443 at its normal current of approximately 200 microAmperes (uA). After the predetermined period of time, microprocessor 110 continues transmitting its low signal to keep switches 441 and 442 closed.

If device 600 performs step 715 (FIG. 2) when device 600 transitions from the battery-save mode to the active mode, then step 715 (FIG. 2) can be comprised of the following steps. Power-on reset circuit 603 continues transmitting a low signal to OR-gate 604, but microprocessor 110 transmits a high pulse through OR-gate 604 to boost timer circuit 602. After transmitting the high pulse, microprocessor 110 transmits a low signal to OR-gate 604 and to switches 441 and 442 in reference oscillator 403 via control line 470 to close switches 441 and 442. In response to the high pulse from microprocessor 110, boost timer circuit 602 resets its timer or counter, and circuit 602 sends a control signal to current source 443 in reference oscillator 403 to boost or increase the bias current of current source 443 to at least twice its normal magnitude. The high bias current supplied by current source 443 increases the negative resistance of reference oscillator 403 to reduce the start-up time for powering-on reference oscillator 403 to be as short as five milliseconds (ms).

Reference oscillator 403 transmits its clock signal through comparator 413 to the timer of boost timer circuit 602. After counting the predetermined number of clock cycles received from reference oscillator 403, boost timer circuit 602 times out and sends a control signal to current source 443 to operate current source 443 at its normal current of approximately 200 microAmperes (uA). After the predetermined period of time, microprocessor 110 continues transmitting its low signal to keep switches 441 and 442 closed.

Returning to FIG. 2, at a step 720 of method 700, the second clock signal is substituted for the first clock signal and is used as the microprocessor clock signal. As an example, mux 608 (FIG. 1) can perform the substitution of step 720 and can provide the second clock signal to microprocessor 110 (FIG. 1) while device 600 (FIG. 1) operates in the battery-save mode. However, in the preferred embodiment, mux 608 (FIG. 1) provides the second clock signal to microprocessor 110 (FIG. 1) only when device 600 (FIG. 1) operates in the active mode. In the preferred embodiment, crystal element 606 and oscillator 613 in power management circuit 605 continue to generate and transmit the first clock signal during and after step 720 to provide a backup or emergency clock signal. However, the first clock signal is no longer used as the microprocessor clock signal after step 720.

At an optional step 725, a third clock signal can be generated. In the preferred embodiment of optional step 725, crystal element 606 and reference oscillator 613 in power management circuit 605 continue to generate and transmit the first clock signal, but the first clock signal is not used as the microprocessor clock signal. The third clock signal is different from the first and second clock signals. The circuitry used to generate the third clock signal consumes more power and has higher current drain than the circuitry used to generate the second clock signal, but the third clock signal can be a more accurate or precise clock signal than the second clock signal. As an example, reference clock PLL 400 (FIG. 1) can generate the third clock signal from the second clock signal. During this embodiment of optional step 725, register 216 (FIG. 1) sends a control signal to reference clock PLL 400 (FIG. 1) via a node 698 (FIG. 1) to power on PLL 400.

If optional step 725 is performed, then an optional step 730 is also performed. At step 730, the third clock signal is used as the microprocessor clock signal during the active mode. The third clock signal can be substituted for the first or second clock signals. As an example, muxes 409 and 608 can perform the substitution of step 730. In the preferred embodiment, the first clock signal continues to be generated during and after step 725.

Next, at a step 735, the device operates in an active mode. Data is programmed into various components of the device during the active mode. As an example, miscellaneous circuits 607 (FIG. 1), register 216 (FIG. 1), reference oscillator 403 (FIG. 1), reference clock PLL 400, and dividers 407 and 408 (FIG. 1) can be programmed during the active mode. Then, at a step 740, the active mode is terminated. In the preferred embodiment, crystal element 606 and reference oscillator 613 in power management circuit 605 continue to generate and transmit the first clock signal during steps 735 and 740, but the first clock signal is not used as the microprocessor clock signal.

Steps 745 and 750 are performed when step 740 is performed to transition the device from the active mode into the battery-save mode or to transition the device from the active mode to the off mode. At step 745, the first clock signal is used as the microprocessor clock signal. If optional steps 725 and 730 were performed, the second clock signal can be substituted for the third clock signal, and then the first clock signal can be substituted for the second clock signal Alternatively, the first clock signal can be substituted directly for the third clock signal. However, if optional steps 725 and 730 were not performed, then the first clock signal can be substituted for the second clock signal. In an alternative embodiment of step 745 when optional steps 725 and 730 were performed, the second clock signal can be substituted for the third clock signal, and the second clock signal is used as the microprocessor clock signal during the battery-save mode.

After step 745, at step 750, a plurality of circuits in the device are turned off. As an example, referring to FIG. 1, miscellaneous circuits 607, reference oscillator 403, and reference clock PLL 400, among others, in device 600 can be turned off or powered off. Register 216 can transmit control signals to miscellaneous circuits 607 via a node 699 and to reference clock PLL 400 via a node 698 to de-select or turn off miscellaneous circuits 607 and reference clock PLL 400, respectively. Microprocessor 110 can transmit a high signal to reference oscillator 403 via control line 470 to open switches 441 and 442 to turn off reference oscillator 403.

In another embodiment of method 700, steps 745 and 750 can be combined. In this embodiment, register 216 transmits a control signal to miscellaneous circuits 607 via node 699 to turn off circuits 607. Then, the second clock signal is substituted for the third clock signal and is used as the microprocessor clock signal. Next, register 216 transmits a control signal to reference clock PLL 400 via node 698 to turn off PLL 400. Subsequently, the first clock signal is substituted for the second clock signal and is used as the microprocessor clock signal. Then, microprocessor 110 transmits a control signal to reference oscillator 403 via control line 470 to turn off oscillator 403. One skilled in the art will understand that many other variations exist.

Next, at a step 755, the device is operated in a battery-save mode. As indicated by a step 760, the primary power supply of device 600 (FIG. 1) remains on during the battery-save mode. The performance of step 760 enables the retention of the data programmed during the active mode. Accordingly, when the device returns to the active mode, the data does not need to be reprogrammed. The elimination of a reprogramming step reduces the time required to transition from battery-save mode to active mode. As indicated by a step 765, the second and third clock signals are preferably not generated during the preferred embodiment of the battery-save mode. Step 765 occurs because reference clock PLL 400 (FIG. 1) and reference oscillator 403 (FIG. 1), among other components, were turned off or powered off during step 750. Step 765 eliminates the high current drain of reference oscillator 403 (FIG. 1) and the even higher current drain of reference clock PLL 400 (FIG. 1) during the battery-save mode. Accordingly, the battery-save mode of method 700 will extend the battery life longer than conventional battery save modes. In the alternative embodiment where the second clock signal is used as the microprocessor clock signal during the battery-save mode, reference oscillator 403 (FIG. 1) is not turned off. Thus, in this alternative embodiment, the battery life is not extended as much as in the preferred embodiment.

Therefore, an improved device having battery-save circuitry and method of operation is provided to overcome the disadvantages of the prior art. The circuitry and method of operation extends battery life by using several current-reducing techniques that do not require turning off the primary power supply. Accordingly, specialized capacitor charging and discharging circuitry is not required, and by-pass capacitors coupled to the primary power supply can have large capacitive values to provide improved reduction of power supply noise. The current-reducing techniques comprise turning off non-essential components during the battery-save mode, turning off the active mode clock generation circuitry during the battery-save mode, and using lower current battery-save mode clock circuitry during the battery-save mode. The device permits data programmed during the active mode to be retained during the battery-save mode so that the data does not need to be re-programmed upon returning to the active mode.

Although the invention has been described with reference to specific embodiments, it will be understood by those skilled in the art that various changes may be made without departing from the spirit or scope of the invention. For instance, the numerous details set forth herein such as, for example, the magnitudes of the boosted and normal bias currents provided by current source 443 and the operating frequencies of crystal elements 401 and 606 are provided to facilitate the understanding of the invention and are not provided to limit the scope of the invention. Accordingly, the disclosure of embodiments of the invention is intended to be illustrative of the scope of the invention and is not intended to be limiting. It is intended that the scope of the invention shall be limited only to the extent required by the appended claims.

What is claimed is:

1. A method of operating a device having battery-save circuitry comprising:

operating the device in a battery-save mode;

using a first clock signal as a microprocessor clock signal while operating the device in the battery-save mode;

operating the device in an active mode; and using a second clock signal and a third clock signal as the microprocessor clock signal while operating the device in the active mode.

2. The method of claim 1 further comprising:

preventing generation of the second clock signal while operating the device in the battery-save mode; and preventing generation of the third clock signal while operating the device in the battery-save mode.

3. The method of claim 1 further comprising:

preventing generation of the second clock signal while operating the device in the battery-save mode.

4. The method of claim 1 further comprising:

turning off a plurality of circuits in the device to operate the device in the battery-save mode.

5. The method of claim 1 further comprising:

keeping a power supply for the device on while operating the device in the battery-save mode.

6. The method of claim 1 further comprising:

powering on a reference oscillator;

boosting a current level of a current source in the reference oscillator to start-up the reference oscillator for a predetermined period of time;

terminating the boosting step after the predetermined period of time; and using the reference oscillator to generate the second clock signal.

7. The method of claim 1 further comprising:

powering on a reference oscillator;

increasing a magnitude of a bias current in the reference oscillator for a predetermined period of time;

decreasing the magnitude of the bias current after the predetermined period of time; and using the reference oscillator to generate the second clock signal.

8. The method of claim 7 further comprising:

using the reference oscillator to count the predetermined period of time.

9. The method of claim 7 wherein:

decreasing the magnitude of the bias current further comprises decreasing the magnitude of the bias current by approximately fifty percent.

10. The method of claim 7 further comprising:

powering on a PLL coupled to the reference oscillator;

using the PLL to generate a third clock signal; and using the third clock signal as the microprocessor clock signal while operating the device in the active mode.

11. The method of claim 10 further comprising:

preventing generation of the third clock signal while operating the device in the battery-save mode.

12. The method of claim 11 wherein:

preventing the generation of the third clock signal comprises powering off the PLL.

13. The method of claim 7 further comprising:

preventing generation of the second clock signal while operating the device in the battery-save mode.

14. The method of claim 13 wherein:

preventing the generation of the second clock signal comprises powering off the reference oscillator.

15. The method of claim 1 further comprising:

programming data during the active mode; and retaining the data during the battery-save mode.

16. A method of operating a device having battery-save circuitry comprising:

transmitting a first clock signal as a microprocessor clock signal to a microprocessor;

generating a second clock signal;

substituting the second clock signal as the microprocessor clock signal to operate the device in an active mode;

generating a third clock signal;

substituting the third clock signal as the microprocessor clock signal to operate the device in the active mode;

operating the device in an active mode;

terminating the active mode;

substituting the first clock signal as the microprocessor clock signal to operate the device in a battery-save mode;

turning off a plurality of circuits in the device;

operating the device in a battery-save mode;

keeping a power supply for the device on during the battery-save mode;

preventing generation of the third clock signal while operating the device in the battery-save mode; and preventing generation of the second clock signal while operating the device in the battery-save mode.

17. The method of claim 16 further comprising:

activating a timer circuit;

powering on a reference oscillator;

boosting a current level of a current source in the reference oscillator until the timer circuit reaches a predetermined time;

terminating the boosting step at the predetermined time; and decreasing the current level of the current source at the predetermined time, wherein:

generating the second clock signal comprises using the reference oscillator to generate the second clock signal.

18. The method of claim 17 further comprising:

using the reference oscillator and the timer circuit to determine the predetermined time.

19. The method of claim 18 wherein:

decreasing the current level of the current source further comprises decreasing the current level by approximately fifty percent.

20. The method of claim 17 further comprising:

powering on a PLL coupled to the reference oscillator, wherein:

generating the third clock signal comprises using the PLL to generate the third clock signal.

21. The method of claim 20 wherein:

preventing generation of the third clock signal comprises powering off the PLL.

22. The method of claim 21 wherein:

preventing generation of the second clock signal comprises powering off the reference oscillator.

23. The method of claim 16 further comprising:

programming data during the active mode; and retaining the data during the battery-save mode.

24. A device having battery-save circuitry comprising:

a power-on reset circuit;

an OR-gate coupled to the power-on reset circuit;

a current-boost timer circuit coupled to the OR-gate;

an oscillator coupled to the current-boost timer circuit;

a PLL coupled to the oscillator; and a multiplexor coupled to the oscillator and the PLL.

25. The device of claim 24 further comprising:

a power management circuit;

a microprocessor coupled to the multiplexor, to the power management circuit, and to the OR-gate, wherein:

the power management circuit provides a first clock signal to the microprocessor;

the oscillator provides a second clock signal to the multiplexor and to the PLL;

the PLL converts the second clock signal into a third clock signal and provides the third clock signal to the multiplexor; and the multiplexor selects one of the second and third clock signals as a microprocessor clock signal and transmits the microprocessor clock signal to the microprocessor.

26. The device of claim 25 wherein:

the oscillator provides the second clock signal to the current-boost timer circuit.

27. The device of claim 24 further comprising:

a comparator coupling the oscillator to the multiplexor, to the current-boost timer circuit, and to the PLL.

28. The device of claim 27 further comprising:

a divider coupling the comparator to the multiplexor.

29. The device of claim 27 further comprising:

a divider coupling the comparator to the PLL.

30. The device of claim 24 further comprising:

a microprocessor coupled to the oscillator;

an other oscillator coupled to the microprocessor;

a first crystal element coupled to the other oscillator; and a second crystal element coupled to the oscillator.

31. The device of claim 30 wherein:

the first crystal element provides a first clock signal to the microprocessor; and the second crystal element provides a second clock signal to the microprocessor.

* * * * *